Sept. 4, 1973     A. S. PITTWOOD     3,756,784

APPARATUS FOR COMPOSTING

Filed July 6, 1970     2 Sheets-Sheet 2

ARTHUR S. PITTWOOD,
INVENTOR

BY Hall & Houghton
ATTORNEY

United States Patent Office 3,756,784
Patented Sept. 4, 1973

3,756,784
APPARATUS FOR COMPOSTING
Arthur Stanley Pittwood, Brewood, England, assignor to International Combustion (Holdings) Limited, London, England
Filed July 6, 1970, Ser. No. 52,481
Claims priority, application Great Britain, July 9, 1969, 34,602/69
Int. Cl. C05f 9/02
U.S. Cl. 23—259.1                                3 Claims

ABSTRACT OF THE DISCLOSURE

Apparatus for composting waste material by aerobic action comprises a series of superposed chambers. Material to be composted is loaded into the uppermost chamber and passes into the lower chambers in turn via controlled transfer ports. Each chamber has its own water and air supply and an agitator for stirring material in the chamber.

BACKGROUND OF THE INVENTION

This invention relates to a method of and apparatus for the composting of waste material containing a substantial proportion of organic material. An example of such waste material is domestic refuse.

It is an object of the present invention to provide a method and apparatus able to convert suitable waste material economically to a soil additive.

SUMMARY OF THE INVENTION

According to the present invention apparatus for the composting of material comprises a plurality of treatment chambers arranged one above the other, the top chamber having a charging port for the entry into the chamber of material a batch of to be treated, and the bottom chamber having a discharge port for the discharge of a treated batch of material from the bottom chamber, adjacent chambers being separated by floors having transfer ports each with means for opening and shutting the ports to isolate the chambers and control the transfer of the material batch from one chamber to the next chamber below, each chamber having (1) an agitator for agitating material when in the chamber, (2) means for supplying air to the chamber for passage through material therein, and (3) further air supply means for changing the atmosphere in the chamber, at least the uppermost chambers each being provided with a water supply, the apparatus also comprising a system for monitoring in each chamber the temperature of material therein and the $CO_2$ content of the chamber atmosphere, and independently controllable means for controlling the rate of agitation in and of water and air supply of the chambers.

DESCRIPTION OF PREFERRED EMBODIMENTS

Figure 1:
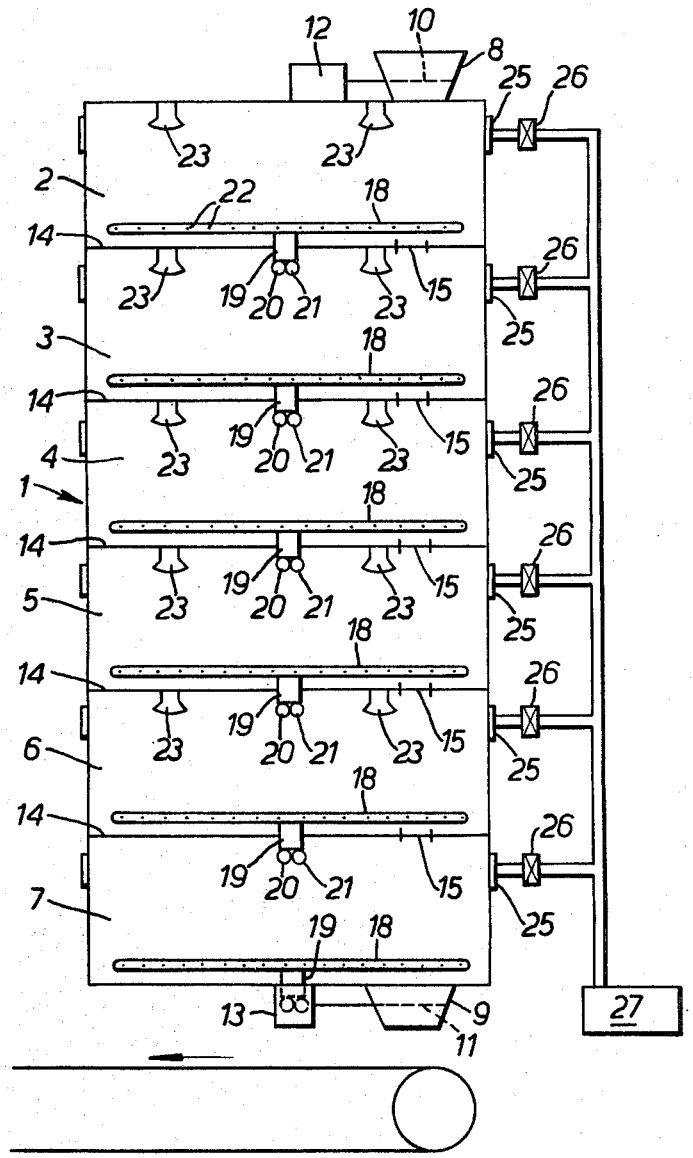
FIG. 1 shows in block schematic form only apparatus embodying the invention, and,
FIG. 2 shows, on an enlarged scale, part of the apparatus of FIG. 1.

The digester 1 shown in FIG. 1 comprises a series of treatment chambers 2, 3, 4, 5, 6 and 7 arranged one above the other. The digester may comprise a large cylindrical tank divided into chambers by a series of vertically-spaced floors or some other construction providing the requisite number of vertically disposed chambers may be used instead.

The digester has a charging hopper 8 at its upper end which provides access to a chamber 2 and a discharge port 9 at its lower end which allows discharge of material from chamber 7, both the hopper 8 and the port 9 having flow control valves of some suitable form which are indicated diagrammatically in FIG. 1 at 10 and 11 respectively and which are operated by mechanisms shown as blocks 12 and 13 respectively. The mechanisms may be manually operated but, preferably they are powered and have a manual control for use in emergencies.

Below the discharge port 9 may be positioned the loading end of a conveyor, for example, a belt conveyor, for transferring the contents of chamber 7 to a required destination.

Figure 2:
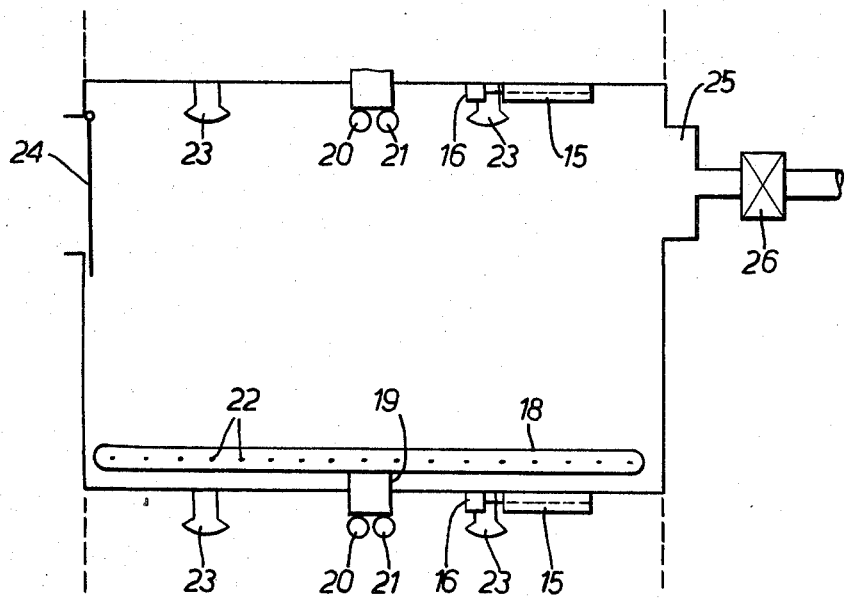

Adjacent chambers are separated from one another by floors 14 imperforate except for a transfer port indicated diagrammatically at 15 in FIG. 1 and shown in more detail in FIG. 2. Each port has an operating mechanism indicated by block 16 (FIG. 2) which can be located internally or externally of the compartment.

Each chamber houses a rotary agitator comprising a series of arms or paddles 18 extending from a central shaft 19 mounted in the floor of the chamber for rotation about the vertical axis of the shaft. Each agitator has its own driving means which may be located internally or externally of the chamber. The paddles 18 may extend radially from the shaft 19 or, preferably, they are curved, when seen in plan, in the direction of rotation of the shaft 19. The paddles 18 are equi-spaced one from the other and they are disposed adjacent the chamber floor and extend almost to the periphery of the latter. Each paddle has a vertical trailing face, a leading face inclined downwardly and forwardly from the upper edge to the level of the lower edge of the trailing face, a longitudinal duct connected, at that end adjacent shaft 19, to air and water supply pipes shown at 20 and 21 respectively via suitable rotary couplings (not shown). The duct communicates with a series of orifices spaced apart along the length of the paddle and which open from the duct to the trailing face below a shield fitted to the latter.

The upper treatment chambers, i.e. chambers 2 . . . 6 also accommodate one or more spray nozzles indicated at 23 in FIG. 2 and which are joined to a water supply independently controllable to each of those chambers whereby water may be added to the material in selected one of said upper chambers.

In the upper part of the curved wall of each chamber is an opening controlled by a flap valve 24 forming an air inlet valve which is self-closing in response to pressures above ambient within the chamber and is self-opening when the pressure in the chamber falls below ambient. There is also an air outlet 25 controlled by a valve 26 and joined to air suction means for example a fan 27 which, as shown, may be common to the outlets 25 of all the chambers. The effect of the fan in any particular chamber is, however, controllable by the valve 26 of that chamber. The fan 27 may form part of fume scrubbing equipment.

The spray nozzles 23 and the water supply pipes 21 are joined via control valves (not shown) to a common supply pipe connectable at will either to a water supply or to a supply of a solution of ammonium sulphate or of other suitable nitrogenous substance. Interlocked valves ensure that the common supply pipe is connected to one supply only at a time.

The air supply pipes 21 are fed with air (herein called primary air) in such manner that the supply of air to each agitator is separately controllable. The supply pipes 21 may be fed from a single air blower but, preferably, several air blowers are fitted. In the lower chambers, the air flow through the material acts to dry the latter and to do this effectively a greater flow is required than is the case with the upper chambers. It may, therefore, be better to supply such lower chambers from a separate blower. In the latter case, independent control over the supply of air to the lower chambers is still provided.

Each chamber also has temperature measuring means for monitoring the temperature of waste material in the chamber and other temperature measuring means for monitoring the temperature of gaseous products emitted by that material. In addition, each chamber has equipment for monitoring the $CO_2$ content of the atmosphere in the chamber.

The temperature monitoring means of each chamber may be used to control automatically the composting conditions within the chamber in conjunction with the $CO_2$ monitoring equipment.

Alternatively, a single set of $CO_2$ monitoring equipment may be fitted and connection means provided for connecting the single set to each chamber in turn on an automatic cycle basis.

Each chamber may also be fitted with means responsive to the level of material in the chamber and which operate, in the event of a predetermined material level being reached, to prevent further additions of water, and/or to open a drain valve and permit excess liquid to be drained away.

The apparatus thus comprises a series of treatment chambers, the conditions in each of which are controllable independently of the conditions in any other chamber.

In each chamber, waste material to be composted is subjected to treatment during which the material is wetted as necessary, agitated and supplied with air or air and water to ensure a requisite degree of aerobic degeneration with no or very little anaerobic activity.

A typical treatment process begins by charging the top chamber 2 with a volume of waste material which is then wetted to a suitable degree in dependence upon the moisture content of the material. It may be better to charge the top chamber 2 in stages, a part of the total quantity of material being fed in at each stage. After a part of the material has been fed in, sufficient time is allowed to ensure that all the material in the chamber is sufficiently wetted with water before the further part of the material is fed into the chamber. The valve 10 is closed as is the transfer port 15 between the chambers 2 and 3. Agitation is then commenced as is the supply of air to the paddles 18 and the temperature of the material and of the gases emitted by the material and the $CO_2$ content of those gases are monitored.

As composting commences, the temperature of the material starts to rise as aerobic degeneration commences To ensure maintenance of degeneration, the temperature of the material is controlled so that it is close to but does not exceed 150° F. Temperature control is effected by varying the rate of agitation, the rate of air supply to the agitator, the rate of air flow through the chamber other than via the agitator (herein called secondary air), and the moisture content of the material. Those parameters being adjusted in conjunction with each other or independently of each other. To reduce the temperature of the material as that temperature approaches the maximum optimum, it is necessary, first, to stop the generation of heat so the primary air flow through the agitator which aerates the moisture from which the bacteria draws oxygen is stopped, and, second to remove heat and moisture from the material and this is achieved by increasing the rate of agitation and releasing steam and/or hot gas from the material into the space in the chamber above the material and this steam and/or hot gas is removed from the chamber by increasing the flow of secondary air through port 24 and out via valve 26 connected directly to the upper part of the chamber by means of the suction created by fan 27.

Alternatively, to increase the temperature of the material, the air flow through the agitator is increased and the flow through valve 26 kept to a minimum, if after a predetermined time period the temperature does not rise, water is sprayed on to the material while maintaining the increased flow of air through the agitator. If the water and increased air flow do not raise the temperature, it can be considered to be due to the fact that digestion is near completion.

In practice, it has been found that the need to stop the temperature going too high is by far the more frequent requirement and that attempts to raise the temperature would be carried out only in the early stages of the process as such a need normally indicates an extra dry material or an unusually inert material. Lack of response to temperature control may give an alarm signal to enable the batch of material to be examined on discharge and either recycled for further treatment or rejected.

The digester functions on a cycle basis, the duration of the cycle being determined by the composting rate. The total treatment time in the digester ensures that after treatment in and passage through all the chambers the material is discharged from chamber 6 substantially fully composted. The fully composted stage is reached when the emission of $CO_2$ into the atmosphere in chamber 6 is at a low level thus indicating that the B.O.D. of the degenerated material has been reduced to that of normal soil.

The embodiment described above is particularly suitable for composting municipal refuse collected daily over a five-day working week. The residence time of material in each chamber is 24 hours but this can be increased, if necessary, at week-ends and at holiday periods without risk since a longer residence time does not deleteriously affect the final product or the process. Thus, with a five-day week and a six chamber digester, an overall cycle of seven days can be adopted.

The composition and thus the rate of degeneration of each batch of material fed into the digester may vary from that of preceding batches and it is essential that each batch receives treatment appropriate to that composition. By providing each chamber with independent control over the factors affecting the rate of degeneration satisfactory treatment in each chamber is effected.

A further advantage accruing from the use of treatment chambers which are, in effect, quite separate from one another, is that it is possible to use the agitator as a means for comminuting the material in the chamber. The independent control over the rotational speed of the agitator enables a greater or lesser speed of rotation to be achieved in one chamber where agitation at the same rotational speed in another chamber would have a deleterious affect.

In addition, the embodiment described above has the very considerable advantage that it is readily possible to ensure that the final product—the composted material—is pathogenically safe. The temperature monitoring arrangements indicate the temperatures which the material in each chamber has attained and the time over which such temperatures have been maintained and from this it can be established whether the material has been held at appropriate temperature for a sufficient period of time to establish pathogenic cleanliness.

If the material contains an insufficient organic content, nitrogenous material may be added as necessary.

It may also be necessary to effect a degree of pulverisation of the material before it is charged into the top chamber of the digester. Household refuse may contain articles of clothing and footwear which require pulverisation. A suitable size of material is that which will pass a 4-inch mesh. Other types of refuse, for example deep litter from chicken farms, or pea pods from a canning factory do not usually require pulverisation.

It may also be possible to add sewage sludge to the material as it is charged into the digester.

In another embodiment of the invention, material may be allowed to remain without agitation in the top chamber 2 to allow a degree of fungus growth which assists in the general composting process. At this stage aerobic activity may not be great but this is stimulated in the manner described above after the material has been transferred into the second chamber 3.

If desired, physical tests of the degree to which the batches of materials have been composted, may be made at any time during the cycle of operations, by suspending, each time a fresh batch of waste material is charged into the top chamber, twenty five (or any other desired multiple of five) frames, the interior of each of which is spanned by a piece of vegetable material such as a sheet of paper of wood or a vegetable leaf, from the roof of the chamber so that the frames are immersed in the batch and, after the batch has been transferred to the second chamber, suspending the frames in a like manner from the roof of this chamber. Hence, during the second day of the cycle, one-fifth of the frames may be extracted from the second chamber one after the other and, after each frame has been extracted, the piece of vegetable material may be removed therefrom and subjected to a strength test in any suitable appliance.

One appliance suitable for this purpose, comprises a flat base having an aperture in one end, and a manually rotatable drum mounted upon and transversely of its opposite end. A plate carried above and parallel to the base by a pair of posts projecting vertically upwards from the base on opposite sides of the aperture, is also formed with an aperture which is located vertically above the base aperture, and is provided with a pair of upwardly extending pins on the side of its aperture adjacent to the drum. Each of the two posts carries a jaw and means for clamping the jaw on to the upper surface of the plate, and a lightweight chain, or analogous flexible member, wound around the drum, is provided with a hook upon its free end.

The piece of vegetable material removed from the extracted frame, is clamped upon the plate by the jaws so that it extends across the plate aperture, the hook is pulled away from the drum and suspended from the clamped material midway between the ends of the plate aperture, and the unwound portion of the flexible member extending between the hook and drum, is inserted between the two pins.

The drum is then rotated so as to unwind the flexible member which runs between the pins and is formed, between the pins and the clamped material, into a bight of gradually increasing depth so that the material is subjected to a gradually increasing load until, eventually, it is ruptured. Since the strength of the test material is reduced in proportion to the degre to which it has been composted, the depth of the bight when the material ruptures, serves as a ready means of ascertaining the degree to which the material has been composted.

The frames remaining in the second chamber at the end of the second day of the cycle, are transferred to each of the lower chambers with the same batch of waste material and the frames are extracted, one at a time until the batch is ready to be discharged from the digester.

I claim:

1. Apparatus for composting a plurality of successive batches of waste material comprising, in combination:
   (a) a series of batch treating chambers arranged one above the other,
   (b) the top chamber of the series having a closable charging port for the entry into the chamber of a batch of material to be treated therein,
   (c) the bottom chamber of the series having a closable discharge port for the discharge therefrom of a batch of material that has been treated successively in the chambers of said series,
   (d) adjacent chambers of said series being contained within a single wall structure and being separated by floors therein,
   (e) said floors having transfer ports therein and being otherwise imperforate,
   (f) means for closing said ports for rendering said chambers essentially separate from one another and segregating from each other batches of material being treated in said chambers, said closing means being operable for opening said ports for transferring the batches to the next succeeding chambers of said series,
   (g) an agitator in each chamber for agitating the batch of material being treated therein, each of said agitators having means for controlling the rate of agitation thereof independently of the rates of operation of the other agitators,
   (h) separate primary air supply means for supplying air to each chamber adjacent the floor thereof for passage through the batch of material being treated therein, each of said primary air supply means having means for controlling the supply of air therethrough independently of the supply of air through the other air supply means,
   (i) separate means for each chamber for changing the atmosphere overlying the material therein, said separate means each comprising air exhaust means connected directly to the upper part of the chamber and secondary air inlet means also located at the upper part of the chamber, each of said air exchaust means having means for controlling the exhausting of air therethrough independently of the exhaustion of air through the other air exhaust means, and each of said secondary air inlet means being responsive to sub-ambient pressure within the chamber for admitting ambient air to the chamber,
   (j) means for supplying water separately to each of the upper chambers of the series, each of said water supplying means having means for controlling the supply of water therethrough independently of the supply of water through the other water supplying means whereby water may be added to the material in selected ones of said upper chambers, and
   (k) means for separately monitoring in each chamber the temperature of material therein as established by the adjustment of said primary and secondary air supplying means, the rate of agitation, the air exhaust means, and the water supply means of said chamber independently of corresponding variables in the other chambers.

2. Apparatus as claimed in claim 1, in which each agitator comprises a paddle positioned adjacent the floor of the chamber and in which said paddle has a substantially vertical trailing face and comprises a duct connected to the separate air supply means for the chamber and a plurality of orifices opening from said duct to the said trailing face of said paddle.

3. Apparatus as claimed in claim 2, in which each paddle has a leading face inclined downwardly and forwardly from the upper edge to the level of the lower edge of the trailing face.

References Cited
UNITED STATES PATENTS

| | | | |
|---|---|---|---|
| 3,314,765 | 4/1967 | Abson et al. | 23—259.1 |
| 2,178,818 | 11/1939 | Earp-Thomas | 71—9 UX |
| 2,639,902 | 5/1953 | Kuebler | 71—9 X |
| 2,182,620 | 12/1939 | Cano | 34—46 X |
| 1,853,421 | 4/1932 | Harris | 34—46 X |
| 1,309,595 | 7/1919 | Fryant et al. | 23—290.5 |

JAMES H. TAYMAN, Jr., Primary Examiner

U.S. Cl. X.R.

71—64 JC, 8, 9, 14; 34—173, 46